US012631716B2

(12) United States Patent
Parker et al.

(10) Patent No.: US 12,631,716 B2
(45) Date of Patent: May 19, 2026

(54) SATELLITE COMMUNICATIONS ANTENNA POINTING FOR POSITIONING

(71) Applicant: CALIOLA ENGINEERING, LLC, Colorado Springs, CO (US)

(72) Inventors: Peter A. Parker, Sandpoint, ID (US); Thomas R. Halford, Colorado Springs, CO (US); Van A. Hovenga, Berkley, CA (US); Adam T.C. Wilander, Fort Collins, CO (US)

(73) Assignee: Caliola Engineering, LLC, Colorado Springs, CO (US)

( * ) Notice: Subject to any disclaimer, the term of this patent is extended or adjusted under 35 U.S.C. 154(b) by 317 days.

(21) Appl. No.: 18/323,103

(22) Filed: May 24, 2023

(65) Prior Publication Data

US 2024/0175972 A1 May 30, 2024

Related U.S. Application Data

(60) Provisional application No. 63/365,314, filed on May 25, 2022.

(51) Int. Cl.
G01S 5/08 (2006.01)
G01S 5/02 (2010.01)

(52) U.S. Cl.
CPC .............. G01S 5/08 (2013.01); G01S 5/021 (2013.01); G01S 5/0226 (2013.01)

(58) Field of Classification Search
CPC .......... G01S 5/08; G01S 5/021; G01S 5/0226
USPC ...................................... 342/357.2
See application file for complete search history.

(56) References Cited

U.S. PATENT DOCUMENTS 12,255,728 B2 * 3/2025 Chakraborty ......... H04W 16/10
2024/0405861 A1 * 12/2024 Minear ................... G01S 13/44

FOREIGN PATENT DOCUMENTS

JP 2023170189 A * 12/2023
WO WO-2022164580 A1 * 8/2022 .......... G01S 19/073

* cited by examiner

*Primary Examiner* — Harry K Liu
(74) *Attorney, Agent, or Firm* — Martensen IP; Michael C. Martensen

(57) ABSTRACT

A residual position correction for one or more non-geolocational satellites is formed by observing through signal reception, from a known location, orbital attributes. Using the residual position correction, the actual position of one or more non-geolocational satellites is determined. Upon denial of GNSS data, the angle of reception of a signal from one of the non-geolocational satellites and the actual position of the satellite, accounting for tropospheric refracting and antenna azimuth and elevations adjustments, is used to determine the geolocation of the antenna terminal.

19 Claims, 6 Drawing Sheets

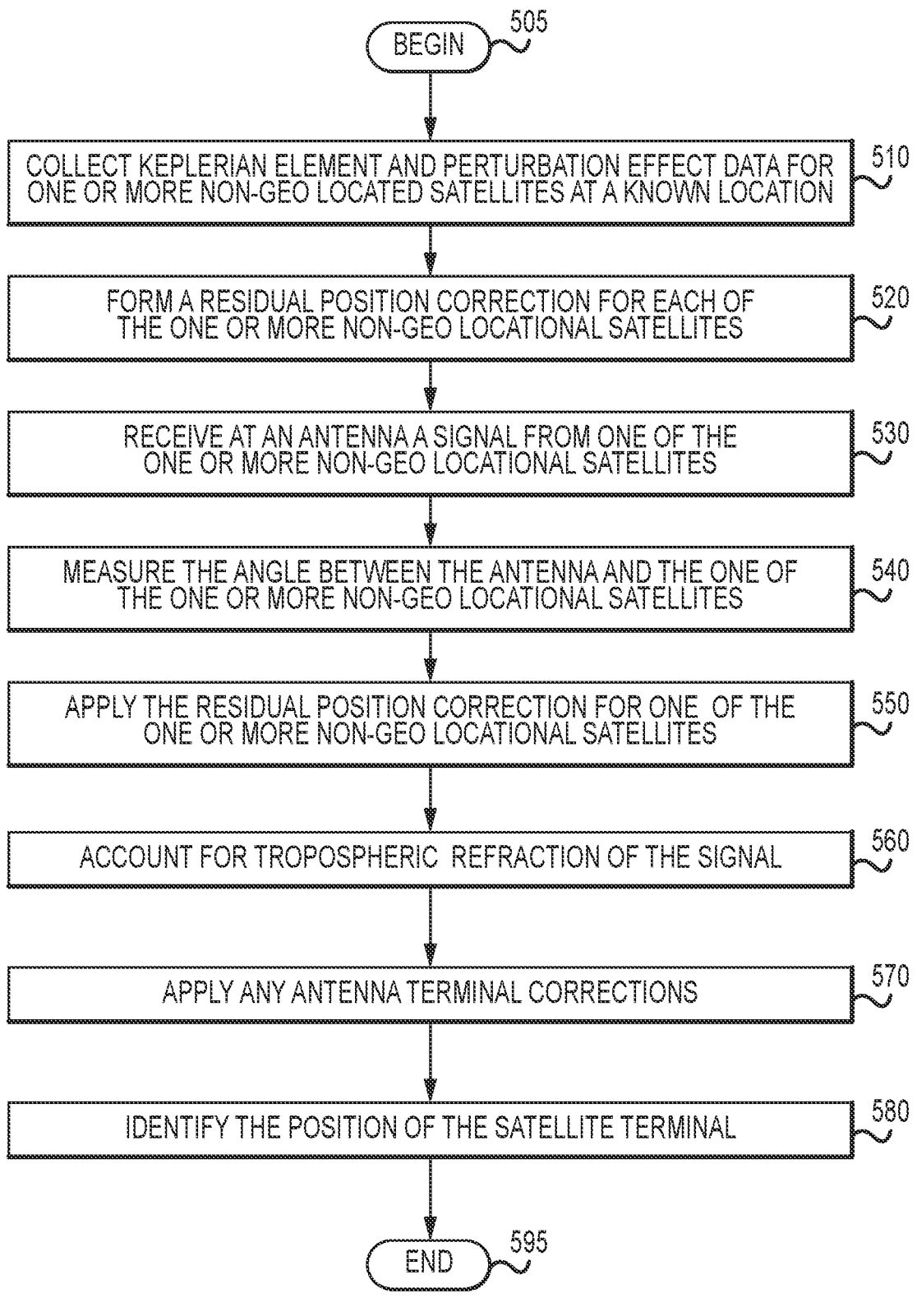

BEGIN ~505

COLLECT KEPLERIAN ELEMENT AND PERTURBATION EFFECT DATA FOR ONE OR MORE NON-GEO LOCATED SATELLITES AT A KNOWN LOCATION ~510

FORM A RESIDUAL POSITION CORRECTION FOR EACH OF THE ONE OR MORE NON-GEO LOCATIONAL SATELLITES ~520

RECEIVE AT AN ANTENNA A SIGNAL FROM ONE OF THE ONE OR MORE NON-GEO LOCATIONAL SATELLITES ~530

MEASURE THE ANGLE BETWEEN THE ANTENNA AND THE ONE OF THE ONE OR MORE NON-GEO LOCATIONAL SATELLITES ~540

APPLY THE RESIDUAL POSITION CORRECTION FOR ONE OF THE ONE OR MORE NON-GEO LOCATIONAL SATELLITES ~550

ACCOUNT FOR TROPOSPHERIC REFRACTION OF THE SIGNAL ~560

APPLY ANY ANTENNA TERMINAL CORRECTIONS ~570

IDENTIFY THE POSITION OF THE SATELLITE TERMINAL ~580

END ~595

FIG.5

SATELLITE COMMUNICATIONS ANTENNA POINTING FOR POSITIONING

RELATED APPLICATION

The present application relates to and claims the benefit of priority to U.S. Provisional Patent Application No. 63/365,314 filed 25 May 2022 which is hereby incorporated by reference in its entirety for all purposes as if fully set forth herein.

STATEMENT REGARDING FEDERAL SPONSORED RESEARCH OR DEVELOPMENT

This invention was made with Government support under contract N68335-21-C-0771 awarded by the Naval Air Warfare Center of the United States Navy. The Government has certain rights in the invention.

BACKGROUND OF THE INVENTION

Field of Invention

Embodiments of the present invention relate, in general, to geolocation systems and more particularly to geolocation in a Global Positioning System denied scenario.

Relevant Background

The Global Navigation Satellite System(s) (GNSS) can precisely identify a receiver's location on the surface of the Earth by knowing, very precisely, where a signal source (satellite) is located at any given time, and, again very precisely, knowing the timing of signals sent by such a source. In essence, an individual needs to know "where" the source is in space, and "when" a given signal is transmitted. GNSS signals imbed in their transmissions to a GNSS compatible receiver, the location of the satellite and the time of transmission. But lacking this information and a receiver to decode it, the signals are useless.

In a GNSS example, the user of the system determines the location of the source (in this case a GNSS satellite) by reading the navigation data embedded in the signal. A read of the same data specifies the timing relationship on the GPS gold codes needed by the user to correlate and make a timing determination. Data in the navigation message is used to correct for deformities (delays due to channel imperfections, as for example, due to the ionosphere). It is at the end of this process that the user can then combine such carefully made and corrected measurements from multiple satellites in an algorithm to determine user location.

A Monitor Station (MS) at a known location assists in identifying the deformities in the signal. When the MS is in proximity to a receiver the MS can determine these deformities and provide that information to the nearby receiver.

Normal communication satellites do not include in their transmissions the location of the satellite. Indeed, in most instances the precise location of the satellite is not required to receive communications signals. All that is needed is a general understanding of where the satellite resides.

Assets operating remotely routinely require the knowledge of their position. GNSS receivers revolutionized the ability of these assets to determine their location quickly and reliably. However, a need remains for these assets to know their position even when GNSS signals become unavailable. Diverse GNSS denied systems exist including star tracking, Inertial Measurement Units (IMU), or trilateration of one or more Radio Frequencies (RF) or using optical signals of opportunity. Each of these GNSS denied geolocation systems provide a position fix along with certain degree of position uncertainty. In most instances the asset's navigation system fuses the various fixes to generate a final location fix, albeit not as accurate as a GNSS solution.

Having redundant backup GNSS systems is complex and costly. It is desirable to equip assets with a GNSS denied system that relies on components already available on the target asset. Remote vehicles or assets utilizing GNSS systems include satellite communication terminals for communications to a geosynchronous satellite, one or more IMUs, GNSS receivers, and a navigation system.

A need exists to use existing components and technology to nonetheless determine an assets geolocation in a GNSS denied environment. These and other deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

The present invention establishes the necessary system and methods for a GPS denied vehicle or asset using an available satellite terminal to provide an accurate geolocation fix. This system integrates data from existing hardware to calculate the required calibrations and compensations to achieve the geolocation solution. One embodiment of the present invention uses an available GPS signal to generate a calibrated system model (termed the modeling mode) that is thereafter used when the GPS signal becomes unavailable to calculate the position of the asset (termed herein as the positioning mode).

In one embodiment of the present invention a method for satellite communication antenna pointing geolocation includes forming, at a first antenna by a first signal, a residual position correction for one of the one or more non-geolocation satellites. The method continues by receiving at a second antenna a second signal from the same one of the one or more non-geolocation satellites. In this instance the second antenna is coupled to a mobile asset and the mobile asset includes a mobile asset attitude. Moreover, the position of the mobile asset is unknown.

Measuring a second antenna angle between the second antenna and the one or more non-geolocation satellites is the next step in the process. The residual position correction for the one or more non-geolocation satellites is applied followed by accounting for a tropospheric refraction of the second signal from the non-geolocation satellites. Lastly the methodology applies a second antenna terminal correction based on the second antenna's mounting to the asset and a mobile asset attitude correction based on the altitude of the asset to thereafter identify the geolocation of the mobile asset using the second signal from one or more non-geolocation satellites.

In another embodiment the methodology described above includes identifying a known location of the first antenna and thereafter receiving at the first antenna a signal from one of one or more non-geolocation satellites. Recall, each of the one or more non-geolocation satellites has a modeled ephemeris. In this instance of the present invention a first antenna angle is measured between the first antenna and a non-geolocation satellite. Tropospheric refraction of the first signal from the non-geolocation satellites is accounted for as is a first antenna terminal correction to the known location of the first antenna. Empirical orbit data is collected at the first antenna and used to compute, for this non-geolocation satellites, an actual ephemeris. Comparing the actual ephemeris with the modeled ephemeris identifies differences between the actual ephemeris and the modeled ephemeris creating the residual position correction.

Another aspect of the present invention includes forming a residual position correction by iteratively comparing the actual ephemeris with the modeled ephemeris, collectively identifying differences between the actual ephemeris and the modeled ephemeris.

In addition, the known location of the first antenna can be identified by using global navigation satellite system data or the known location of the first antenna can be based on a satellite ground station. In another embodiment of the present invention the second signal includes an imbedded second signal transmit time that is decipherable by the second antenna. And a revised position of the mobile asset can be identified by using atmospheric refractive parameters at an initial position determination.

In one version of the present invention the residual position correction includes refining orbital parameters. These orbital parameters are selected from a group (also known as the Keplerian or equivalent orbit set) consisting of the Semi-major axis, Eccentricity, Inclination, Right Ascension, Argument of Perigee, and Mean Anomaly. These orbital parameters are further refined by identifying propagation codes for each of the one or more observed non-geolocation satellites.

Another feature of the present invention refines standard orbital parameters by identifying orbital drift for the non-geolocation satellites. In addition the residual position correction for the non-geolocation satellites is refined by using a plurality of first antennas, each with a known location.

In another embodiment of the present invention, a system for satellite communication antenna pointing geolocation includes a residual position correction formed at a first antenna by a first signal from one or more non-geolocation satellites, and a second signal received at a second antenna from the same non-geolocation satellites. This second antenna is, in another version of the present invention, coupled to a mobile asset and the mobile asset includes a mobile asset attitude recognizing that the position of the mobile asset is variable and unknown. This system also includes a second antenna angle measurement between the second antenna the non-geolocation satellite and an ephemeris for the non-geolocation satellite corrected using the residual position correction.

A tropospheric refraction accounting of the second signal is included in the system as is a terminal correction of the second antenna and a mobile asset attitude. A positioning mode engine identifies the position of the mobile asset from the second signal, the second antenna angle, the corrected emphasis, the tropospheric refraction accounting, and the second antenna terminal correction.

Additional features of the system for satellite communication antenna pointing geolocation include a known location of the first antenna and a first signal received at the first antenna from one of one or more non-geolocation satellites. Recall, each of the one or more non-geolocation satellites has a modeled ephemeris.

The system also includes a first antenna angle measured between the first antenna and one of the one or more non-geolocation satellites and a tropospheric refraction accounting of the first signal. A first antenna terminal correction applied to the known location of the first antenna is also included in the system wherein the first antenna terminal correction includes antenna tilt and offset errors.

Collected empirical orbit data of the non-geolocation satellites provides the actual ephemeris of the satellite. Differences between the actual ephemeris and the modeled ephemeris for non-geolocation satellites forms the residual position correction.

The features and advantages described in this disclosure and in the following detailed descriptions are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein:

FIG. 5 is a flow chart of one methodology embodiment according to the present invention for geolocation through satellite communication antenna pointing.

Figure 1:
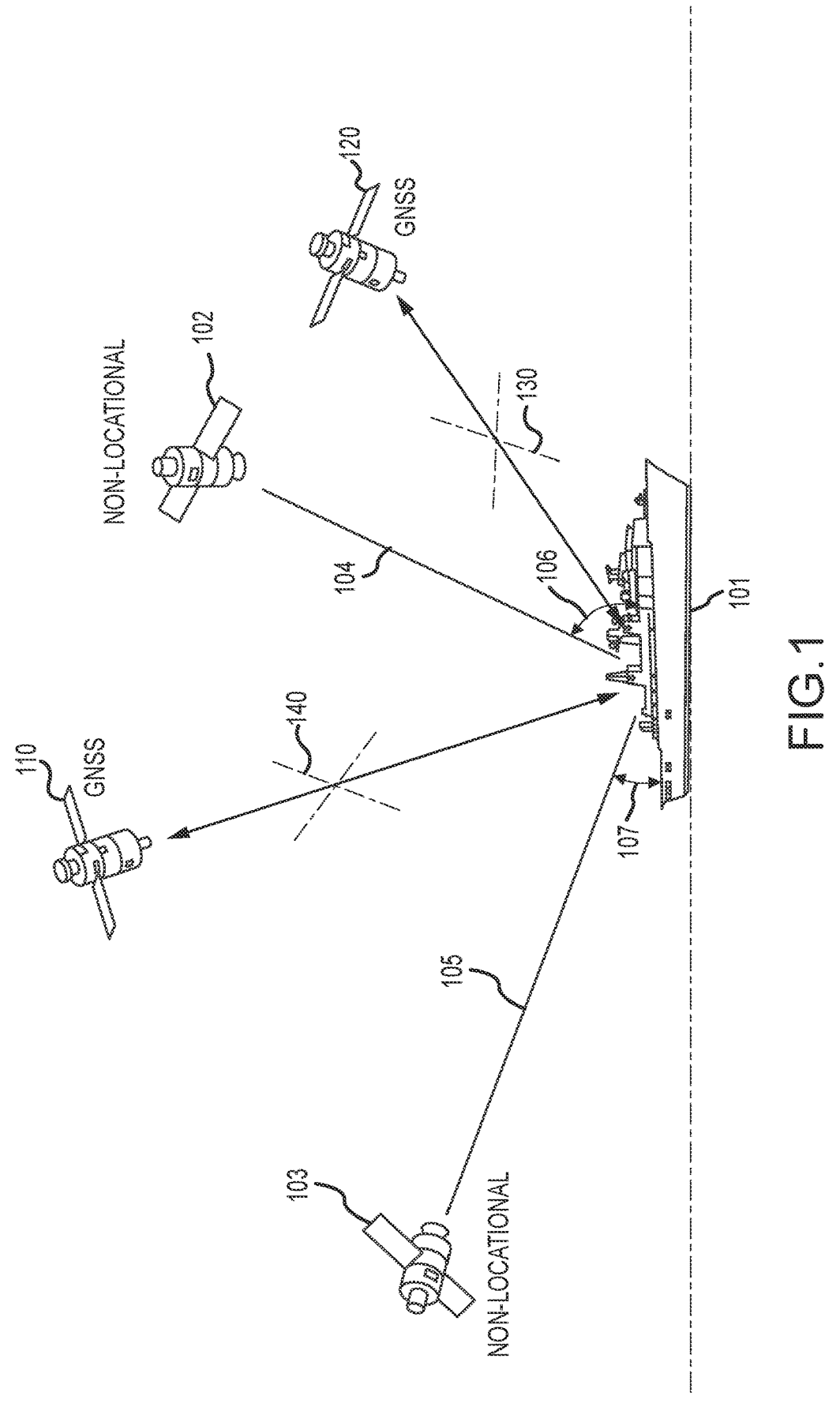
FIG. 1 shows a mobile asset possessing components for receiving GNSS information yet equipped to determine its geolocation using one embodiment of the satellite communication antenna pointing system of the present invention.

The Figures depict embodiments of the present invention for purposes of illustration only. Like numbers refer to like elements throughout. In the figures, the sizes of certain lines, layers, components, elements, or features may be exaggerated for clarity. One skilled in the art will readily recognize from the following discussion that alternative embodiments of the structures and methods illustrated herein may be employed without departing from the principles of the invention described herein.

DESCRIPTION OF THE INVENTION

A system and associated methodology determines the geolocation of an antenna terminal, and any asset or vessel on which the antenna terminal is associated, using a signal from a non-geolocational (non-GNSS) satellite. A residual position correction for one or more non-geolocational satellites is formed by observing through signal reception, from a known location, orbital attributes of these non-geolocational satellites. Using the residual position correction, the actual position of the one or more non-geolocational satellites is determined. Upon denial of GNSS data, the angle of reception of a signal from one of the observed non-geolocational satellites along with the actual position of the satellite, an accounting for tropospheric refraction, and antenna azimuth and elevations adjustments, are used to determine the geolocation of the antenna terminal.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The term "ephemeris" means a tabular statement of the assigned places of a celestial body for regular intervals. A representation of an object's position and velocity over time, or coordinates derived from that, is called an "ephemeris". Historically, the term "ephemeris" referred to a printed table of position coordinates at discrete instants but is now extended to modern computational concepts like representations in time-continuous polynomial data-files. Imprecise ephemeris for satellites can quite easily be obtained from orbital prediction software that uses Two Line Elements (TLEs) as input. As an example of how such imprecise information provides generally useful data, consider a website such as N2YO.com https://www.n2yo.com/. At this website it is possible to observe the orbital paths of various satellites, computed using TLE information. TLE information is generated by the U.S. Space Surveillance Network, is publicly available for most space sources, and permits the computation of satellite ephemeris. The precision with which ephemeris can be obtained by such a process can result in errors of many km. Errors of that magnitude generally preclude utilization of the ephemeris for navigation in any traditional method of navigation, since that error will be reflected in user location error.

The terminology used herein is for the purpose of describing embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will also be understood that when an element is referred to as being "on," "attached" to, "connected" to, "coupled" with, "contacting", "mounted" etc., another element, it can be directly on, attached to, connected to, coupled with, or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" to another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under", or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Included in the description are flowcharts depicting examples of the methodology which may be used to determine an asset's geolocation using antenna pointing angles to one or more communication satellites. In the following description, it will be understood that each block of the flowchart illustrations, and combinations of blocks in the flowchart illustrations, can be implemented by computer program instructions. These computer program instructions may be uploaded to a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be uploaded to a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words", or the like. These specific words, however, are merely convenient labels and are to be associated with appropriate information elements.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Determining one's geolocation is a necessary step for numerous activities and undertakings. The earliest explorers found their way across the ocean using little more than a sextant of the stars. Today multiple GNSSs provide accurate geolocation data. However, GNSS data is not entirely reliable. GNSS systems government enterprises and in certain situations GNSS data may either be restricted or interdicted by an adversary. One or more embodiments of the present invention use non-GNSS satellites to provide geolocation data based on the time distance of arrival of their communication signals. These non-GNSS satellites can, for example, be any satellite, whether Highly Elliptical Orbit (HEO), Geosynchronous Orbit (GSO), Geostationary Orbit (GEO). Middle Earth Orbit (MEO) or Low Earth Orbit (LEO). For the present invention, LEO: Apogee altitude $h_A$<2000 km, GEO: Perigee altitude $h_P$>40164 km and apogee altitude $h_A$<44164 km, MEO: Perigee altitude $h_P$>2000 km and apogee altitude $h_A$<40164 km, GTO (Geo-stationary Transfer orbit): Perigee altitude $h_P$<2000 km and apogee altitude $h_A$>40164 km, HEO: all other objects.

FIG. 1 shows a high-level view of a Satellite Communications Antenna Pointing for Positioning (SCAPP) system according to one embodiment of the present invention. In this example an asset/vehicle 101 is communicating with one or more, non-geolocational geosynchronous satellites 102, 103 through an RF data link 104, 105.

The asset 101 also includes GNSS receivers (or similar geolocation technology) and is aware of its position from GNSS satellites 110, 120. Nonetheless, the asset 101 maintains a communication link with the one or more communication satellites 102, 103 simultaneously either using multiple satellite terminals or sequentially using a single terminal. Each satellite terminal on the asset 101 actively tracks and measures the angle or angles 106, 107 from the asset to the communication satellite. When the GNSS signal becomes unavailable 130, 140, one embodiment of the present invention uses the actual position the of non-geolocational satellites 102, 103, and the known angles 106, 107 to calculate the position fix of the asset 101.

Communication satellite ephemeris data is not precise. Or more accurately, inaccuracies in the actual location of a satellite result in a corresponding error in the location of the receiver. One of reasonable skill in the relevant art will appreciate, that a signal, originating at a certain location, travels at the speed of light to reach the receiver. Knowing the time that the signal is transmitted and the time that the signal is received, a distance between the transmitter (the satellite) and the receiver (the asset) can be determined. The resulting distance is a sphere on which the receiver is located. Alternately, if the angle from the surface of the earth is known at which the signal is received, and a location of the transmitter is known, the duration of the transmission is irrelevant, assuming the receiver resides on the surface of the earth. This means that even a signal that is encrypted and unreadable other than to identify the signal over noise can provide the location of the receiver, when the precise location of the transmitter is known and when the precise angle of the antenna receiving the signal can be determined.

Determining the location of a receiver based on the angle of radio transmission reception from two or more transmitters is a technique known as Radio Direction Finding (RDF).

RDF is commonly used in various applications, including navigation, communication systems, and locating sources of interference.

To understand how the location of the receiver can be determined, let's consider a scenario with two transmitters, recognizing that the principles can be extended to more transmitters as well.

By measuring the angle of reception from each transmitter, you can obtain a set of angle measurements. These angles represent the Direction of Arrival (DOA) of the signals from the respective transmitters at the receiver location. To use triangulation effectively, you need to know the precise locations of the transmitters. The locations of the transmitters serve as reference points for determining the receiver's position.

The receiver must be equipped with a direction-finding antenna or an array of antennas to measure the angles accurately. These antennas are designed to receive signals from specific directions, allowing the receiver to determine the azimuth and/or bearing angle to each transmitter. Once the angle measurements from the transmitters are obtained, the relative angles can be calculated between the receiver and each transmitter. These angles can be calculated using techniques such as trigonometry or signal processing algorithms.

Using the relative angles and the known transmitter locations, you can perform triangulation calculations. Triangulation involves using the angles and distances between known points to determine the location of an unknown point. In this case, the unknown point is the receiver's location. By intersecting the lines of bearing (lines formed based on the relative angles) from the known transmitter locations, you can determine the receiver's position. The intersecting point represents the estimated location of the receiver.

It's important to note that the accuracy of the location estimation depends on several factors, including the accuracy of angle measurements, the geometry of the transmitter locations, and any potential sources of error or interference. Using multiple frequencies or incorporating additional measurements can help improve the accuracy and reliability of the receiver's location estimation.

One embodiment of the present invention resolves imperfections in the angle of the antenna, with respect to the surface of the earth, and the exact location of one or more communication satellites. In particular, the sources of error corrected for in the present invention include, satellite position, tropospheric. (atmospheric) refraction, and satellite terminal (antenna) and asset orientation.

Figure 2:
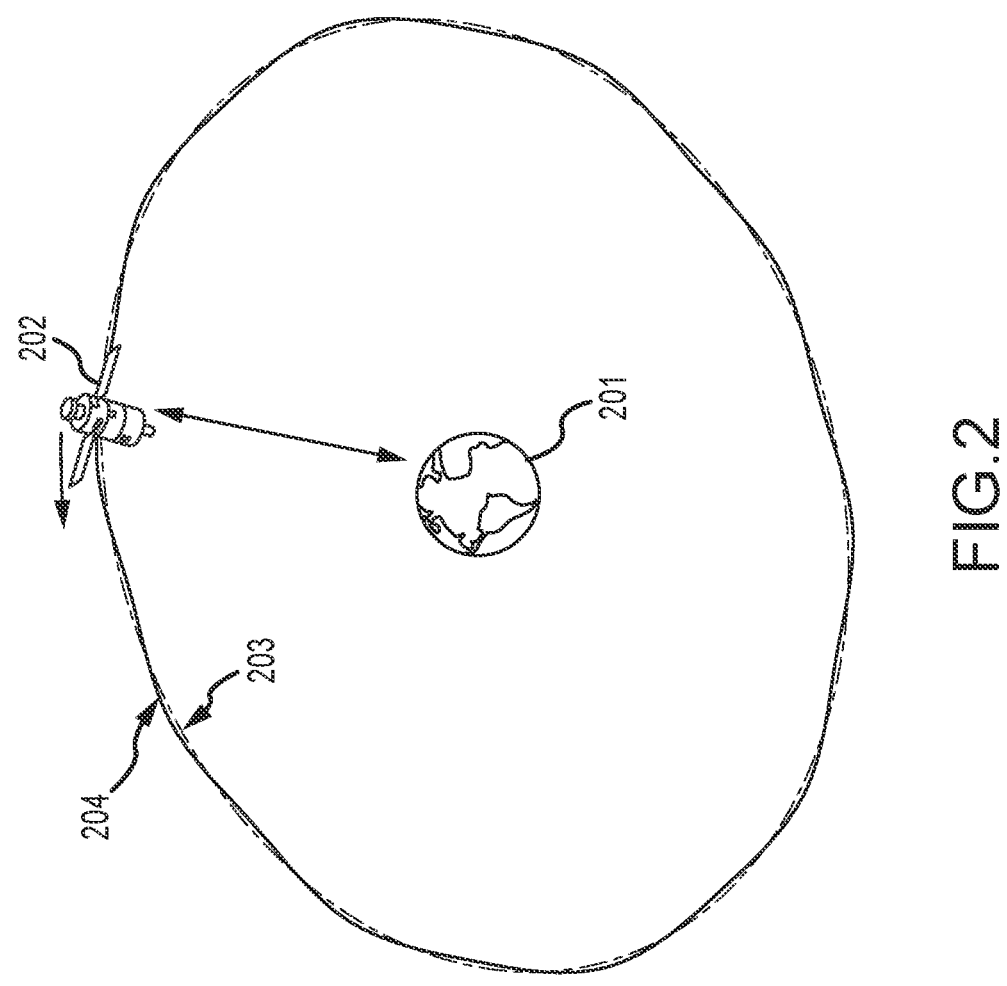
FIG. 2 shows a high-level view of a comparison of a modeled and an actual orbit of a satellite according to one embodiment of the present invention.

The position of a satellite is typically determined from using the most recently estimated orbital element set parameters encapsulated in a Two-Line Element set (TLE) and propagated forward in time using the Simplified General Perturbations (SGP4) propagation code. It is known that the accuracy of the SGP4 propagation code using available TLE is on the order of several kilometers and this error increases over the period of time for a geostationary satellite. There are repeatable orbital variations that are not well modeled by the SGP4 code. According to one embodiment of the present invention, this, and other, errors can be removed with observations over a period. FIG. 2 illustrates a non-geolocational communication satellite 202 orbiting around the earth 201 with the dashed line 203 representing the SGP4 (ephemeris) modeled orbit and the solid line 204 represents the actual orbit. The modeled orbit can also be envisioned as a tube through which the actual orbit travels. One embodiment of the present invention observes the actual location of the satellite in comparison to the modeled location, thereby developing a residual position correction.

Orbital parameters are crucial in determining the satellite ephemeris, which refers to the predicted position and velocity of a satellite at a given time. These parameters describe the satellite's orbit around the Earth and help calculate its position accurately. The two primary orbital parameters used in satellite ephemeris determination are the Keplerian (or equivalent) elements and perturbation effects.

Keplerian Elements include a. Semi-major axis (a): It represents the average distance between the satellite and the center of the Earth. It defines the size of the orbit. (b): Eccentricity (e): This parameter measures the deviation of the satellite's orbit from a perfect circle. An eccentricity of 0 denotes a circular orbit, while values between 0 and 1 represent elliptical orbits. (c): Inclination (i): It specifies the angle between the satellite's orbital plane and the Earth's equatorial plane. (d): Right Ascension of the Ascending Node (Ω) This element defines the angle between the reference direction (e.g., Vernal Equinox) and the point where the satellite's orbit crosses the Earth's equatorial plane in an ascending direction. (e): Argument of Perigee (ω): It indicates the angle between the ascending node and the point where the satellite is closest to the Earth (perigee) in its orbit. (f): Mean Anomaly (m): This parameter represents the angular distance traveled by the satellite in its orbit since it crossed the reference direction at a specific time.

Perturbation Effects: While Keplerian elements provide a simplified representation of satellite orbits, perturbation effects account for the various forces that affect a satellite's trajectory. These effects include (a.) Gravitational forces from the Moon, Sun, and other celestial bodies. (b.) Atmospheric drag caused by the residual atmosphere at the satellite's altitude. (c.) Solar radiation pressure exerted on the satellite's surface. (d.) Non-spherical shape of the Earth. (e.) Relativistic effects such as the gravitational time dilation.

The accuracy of satellite ephemeris can diminish over time due to several factors. The accuracy of ephemeris predictions heavily relies on the accuracy of the initial orbital measurements. Errors or imprecise measurements during the satellite's launch or early orbital phase can lead to inaccuracies in the ephemeris.

Although perturbation effects are considered in the calculations, their complexity and variability make it challenging to precisely account for all factors. Small variations in gravitational forces, atmospheric conditions, or solar radiation pressure can accumulate over time and lead to deviations from the predicted or modeled orbit.

Satellite orbits can also be influenced by external factors such as space debris, collisions, or maneuvering for operational reasons. These influences can alter the orbit and introduce discrepancies between the predicted and actual positions of the satellites.

Orbital parameters, especially for satellites in Low Earth Orbit (LEO), may need to be periodically updated to account for changes in the orbit caused by perturbations or maneuvers and even drag induced by interacting with the upper atmosphere.

Figure 3:
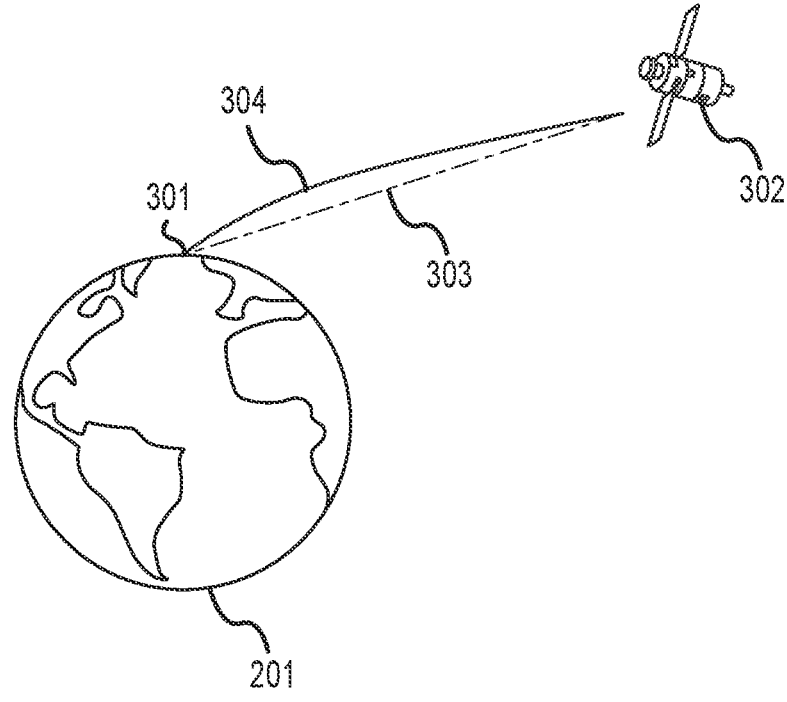
FIG. 3 is an illustration of atmospheric refraction of radio signals according to one embodiment of the present invention.

As radio waves propagate through the troposphere, a slight amount of refraction causes a shift in the apparent elevation angle from which the signal is coming. This is known as tropospheric refraction. This refracted angle is modeled through standard atmospheric simulations and removed. FIG. 3 illustrates the tropospheric refraction of an RF signal between an earth-based terminal 301 and a satellite 302. The signal path 303, (dashed line) illustrated by the straight-line is the true path between the terminal satellites 301 and satellite 302 assuming no refraction. The signal path (solid line) 304 illustrates the refracted and observed path. The difference in elevation angle between the two paths is caused by refraction due to the troposphere.

Tropospheric refraction refers to the bending or change in direction that radio signals experience as they pass through the Earth's troposphere, which is the lowest layer of the atmosphere. This phenomenon occurs due to the variation in the refractive index of the troposphere caused by changes in air density, temperature, and humidity.

When radio signals originating from an orbital body, such as a satellite, pass through the Earth's troposphere, they encounter variations in atmospheric conditions. These variations cause the speed of the radio signals to change, leading to a bending or refraction of the signal path. As a result, the angle at which the signal is received at a terminal on the Earth's surface is different from the angle at which it was transmitted from the satellite.

The impact of tropospheric refraction on the angle of the received signal at a terminal can be significant, especially for signals that are transmitted at low angles or near the horizon. The bending of the signal path can cause the signal to be deflected upward or downward, leading to changes in the elevation angle.

If the signal is bent downward, the received angle at the terminal will be lower than the actual angle of the satellite. This effect is known as "negative refraction." On the other hand, if the signal is bent upward, the received angle will be higher than the actual angle, referred to as "positive refraction." These refraction effects can introduce errors in the determination of the satellite's position or the accuracy of antenna pointing systems.

The magnitude of tropospheric refraction depends on various factors, including the frequency of the radio signal, the distance between the satellite and the terminal, the atmospheric conditions, and the elevation angle of the satellite. Higher frequencies are generally less affected by refraction compared to lower frequencies. Additionally, refraction effects are more pronounced when the signal passes through denser regions of the troposphere, such as near the Earth's surface.

The present invention mitigates the impact of tropospheric refraction on signal reception, using various techniques. These include using antenna designs with higher gain and narrower beamwidths, adaptive beamforming, and signal processing algorithms that compensate for the expected refraction effects. Additionally, accurate modeling of atmospheric conditions and real-time monitoring of atmospheric parameters help improve the accuracy of signal reception and minimize errors introduced by tropospheric refraction.

Figure 4:
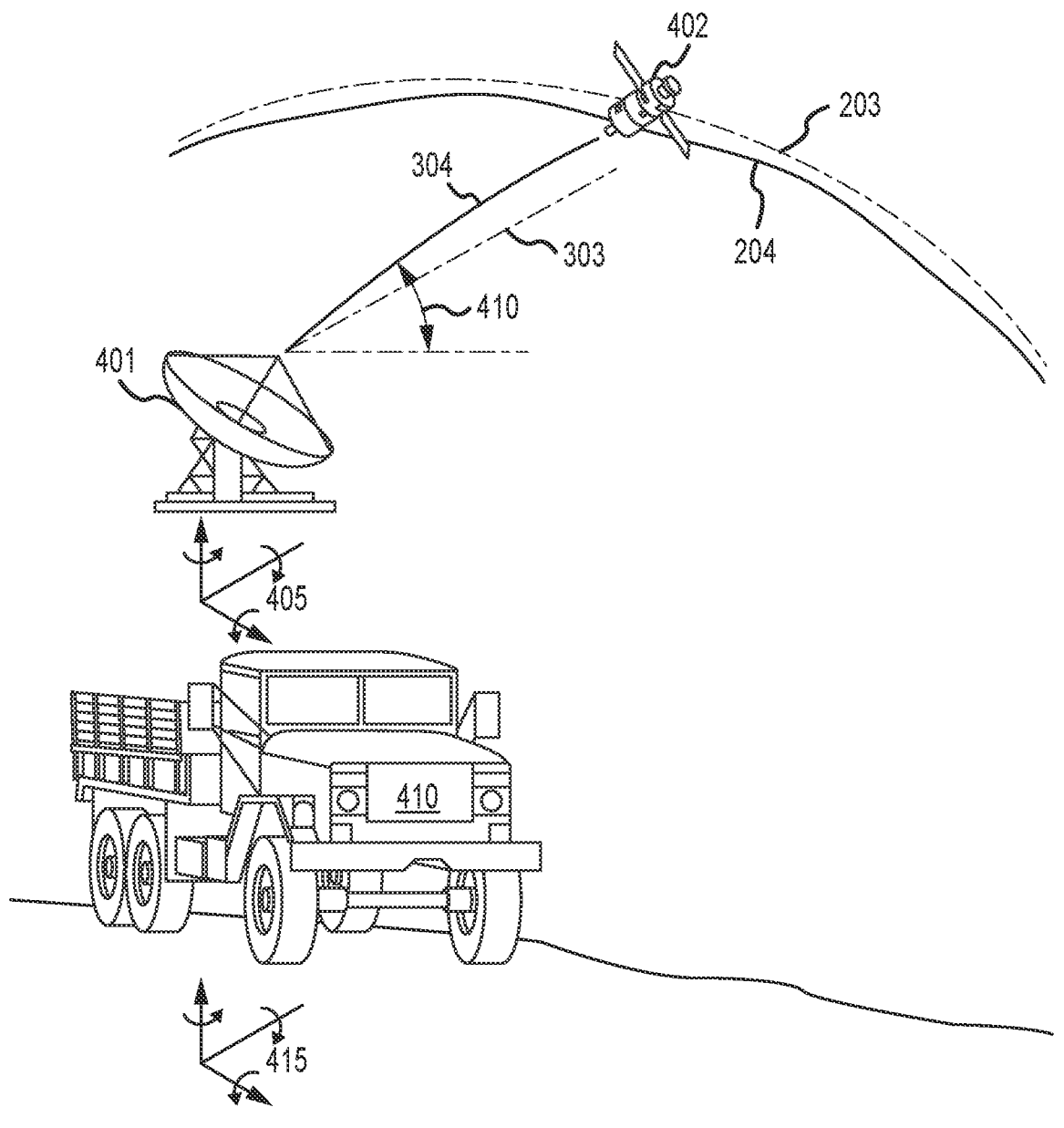
FIG. 4 shows mounting, and location variances of an antenna positioned on a mobile asset, according to one embodiment of the present invention.

Another factor in determining an asset's location using angular information from a satellite terminal is the orientation or mounting of the antenna with respect to the vehicle and the altitude of the vehicle with respect to the plane of the earth. The present invention recognizes that a satellite terminal may not be installed level to the plane of the earth or at the same plane as the IMU within the vehicle/asset. These differences result in a tilt error in the reported angles of the antenna. In addition, there may be an offset in the calibration of the true north position as reported by the satellite terminal. Moreover, the vehicle itself may not be level to the plane of the earth. FIG. 4 illustrates the effect of this rotation on the measured angle as well as the changes in angle and offset due to the position of the asset. The terminal 401 has a small rotation 405 with respect to the local east-north-up (ENU)

coordinate system as does the asset 410, 415. The as-reported angle 410 (with respect to the local ENU coordinate system) does not exactly point to satellite 402, and according to one embodiment of the present invention, is accounted for in the determination of the actual angle of the receiver to the communication satellite.

The present invention compensates and corrects for the lack of precision in the various components that contribute to the position determined from angular measurement of one or more satellite communications.

The process to determine a geolocational fix from angular communication signal measurements of one or more communication satellites begins with accurately determining the satellite's location. As previously described, the accuracy of a satellite's path or ephemeris varies widely. One embodiment of the present invention observes signals from non-geolocational satellites at a known position on the earth, and using the angular information gained from the antenna and the modeled satellite location, determines the location of the antenna. As the true location of this antenna is known the error observed in the geolocation determination must be attributed to errors in the location of the satellite, tropospheric refraction, and/or terminal corrections of the antenna mounts. And, if the antenna is mounted to a mobile asset, corrections due to the orientation of the asset must also be considered.

In one embodiment of the present invention GNSS data determines a precise location of a first antenna. (Alternatively, the location can be known via other means as would be apparent to one of reasonable skill in the relevant art). At the same time this first antenna is observing a signal from one or more non-geolocation satellites and comparing an angular signal location determination with the location determined made from the GNSS data. During the time when the GNSS signal is available, corrections are observed and recorded for the two largest sources of error. Those two largest sources are the satellite antenna terminal bias and the orbit ephemeris residual.

To separate the effect of these error terms and individually estimate their contributions, one embodiment of the present invention uses data from an integer number of orbits to estimate the satellite antenna terminal tilt. By doing so any orbital ephemeris perturbations can be eliminated resulting in an estimate of any tilt/pointing bias inherent in the satellite antenna terminal. This estimate becomes more accurate by including data from the same satellite antenna terminal looking at multiple geosynchronous (or similar) satellites over a period in addition to viewing the geosynchronous satellite from multiple viewing angles from the mobile platform.

Once the terminal antenna tilt has been estimated, the correction can be applied to all recorded data for this terminal and an estimate of an orbit ephemeris residual, also referred to herein as the residual position correction, is calculated. To accomplish this, the rotation corrected azimuth and elevation measurements from the antenna terminal are used.

In yet another instance of the present invention the satellite antenna terminals can provide an estimated range to the satellite. In the instance of a cooperative communication satellite the signal may provide a range/timing measurement as part of their communication protocol. While the position estimates are noisy, they can be transformed to an Earth Centered Inertial (ECI) coordinate frame of reference and the residual position correction for that satellite can be estimated.

The present invention, according to one embodiment uses the received satellite information and calculates the position of the satellite using the SGP4 or similar orbit propagator for each time that a terminal azimuth and elevation message is received. The same process corrects the elevation angle for the standard tropospheric refraction model. The process saves terminal azimuth and elevation, satellite position, vehicle attitude (e.g., yaw, pitch, roll), and GNSS location data in a database and uses this data to generate an accurate system model and a residual position correction to the satellite ephemeris.

In another embodiment of the present invention, an orbit ephemeris residual estimation is used to find an unmodeled or mismodeled satellite position, and ultimately a residual position correction to the satellite ephemeris. An empirical orbit model is used to capture the differences between the modeled orbit and the actual orbit. The orbit ephemeris residual estimation is accomplished in two parts. First estimates of the standard orbital parameters that are input to the propagation codes are refined. This allows for capturing the most accurate model for the bulk of the motion and any drift in motion that happens from one orbit to the next. Then the residual between the modeled position and measured position is calculated and a curve fits to this residual.

The process starts with time-aligned data, from which at least an orbit's worth of the most recent data for a single satellite is extracted (this can include data from multiple terminals to improve accuracy of orbit determination). An orbit set estimation algorithm estimates the standard orbit parameters based on the measured satellite position. One such parameterization of the orbit set is the following: semimajor axis, eccentricity, inclination angle, longitude of the ascending node, argument of perigee, and mean anomaly. In addition, orbit drift parameters including rate of change of inclination angle, rate of change of longitude of the ascending node, and mean motion correction are estimated.

The modeled satellite position estimates are transformed into an ECI data frame. From these estimates the residual satellite position is calculated, and this residual value is averaged for each time the satellite is at the same position in the orbit. This process provides a single orbit's worth of noisy residual data.

A best-fit smooth curve to this residual is calculated by transforming the residual data with a Discrete-Time Fourier Transform (DTFT), choosing the largest frequency-domain coefficients to keep, and zeroing out the rest, and then transform the data back using and inverse DTFT. This creates a noise-reduced periodic function that best fits the residual orbit data forming a residual position correction.

The residual position correction, once formed for one or more non-geolocational satellites, can be stored or conveyed to any mobile asset for use in a GNSS denied environment. In such an instance the mobile asset and associated satellite terminal identifies and receives a signal, from the non-geolocational satellites to determine its location. As with the first antenna terminal, the mounting/tilt terminal bias of the antenna must be considered as must the orientation of the asset itself.

For example, assume the mobile asset is a ship or vessel. An antenna mounted on the fore deck of the vessel will possess certain tilt/mounting characteristics with respect the IMU of the ship. For example, the antenna installation may have resulted in it having a certain degree of left, right, fore, or aft tilt and it's 0-degree reference may be slightly different than the 0-degree reference of the ship. These values are determined and stored for each satellite terminal associated with each mobile asset. And certainly the motion of the ship must also be considered.

In normal operations the vessel will receive GNSS positional data. Concurrently, the antenna terminal will collect data with respect to one or more non-geolocational satellites to develop a residual position correction for each of one of the one or more non-geolocation satellites it observes. As previously stated, residual position correction data can be received and/or stored onboard gained from other observations of the same one or more non-geolocational satellites.

When GNSS positional data is unavailable, the antenna terminal can seek and receive a signal from one or more of the one or more non-geolocational satellites. In each case the antenna terminal collects data with respect to the exact angle of the antenna during reception as well as the orientation of the vessel from the IMU. These angles are combined to find the three-dimensional rotation that transforms the body-centric coordinate frame of the antenna to an ENU coordinate reference frame.

1) In one embodiment of the present invention the satellite antenna terminal tilt estimation is a three-dimensional rotation that transforms the body-centric coordinate frame of the satellite antenna terminal to an ENU coordinate reference frame. Assuming the installation of the satellite antenna terminal is very close to an ENU reference, these deviations should be minor. Hereafter is a procedure for estimating the satellite terminal tilt, according to one embodiment of the present invention:

Save time-stamped and time-aligned data into a persistent database:

Satellite terminal azimuth

Tropospheric corrected elevation

Range between terminal and satellite

Satellite position as predicted by on orbit propagator, GPS derived position. (Note that for asynchronous data, an interpolator is used to generate time-aligned data for all desired fields.)

2) Extract an integer number of orbits worth of data for a single satellite terminal (this can include integer number of orbits from multiple satellites).

3) For each time sample of data, calculate the unit vector that points from the satellite terminal location to the predicted location of the satellite.

4) For each time sample of data, calculate the unit vector that points in the measured terminal pointing direction (i.e., terminal azimuth and elevation).

5) Use an attitude determination algorithm to output a three-dimensional rotation matrix.

6) Rotate the recorded terminal azimuth and elevation from the local body reference frame to the local ENU reference frame.

With the angle of the received transmission resolved to the plane of the earth, the tropospheric refraction taken into consideration, and the actual location of the satellite identified by using the residual position correction, the position of the satellite antenna terminal, and thereby the vessel, can be determined.

FIG. 5 is a flow chart for one embodiment of a methodology, according to the present invention, for position determine using one or more non-geolocation satellites. The process begins 505 with collecting Keplerian elements and perturbation effect data for one or more non-geolocation satellites. This data can be collected 510 from an antenna at a known location receiving a signal from such satellites. From the data a residual position correction is formed 520 modifying the modeled position of the satellite to its actual, observed location. This data is stored and, in one embodiment of the present invention, made available to a variety of assets. In a scenario in which GNSS data is unavailable, the position of an antenna terminal, and thus the asset on which the terminal is mounted, can be determined from signals from these non-geolocational satellites.

The process continues by receiving 530 a signal from one of the one or more non-geolocational satellites. The angle from the antenna to the satellite is measured 540 and the residual position correction to identify the actual location of the satellite is applied 550. Tropospheric refraction of the signal's angle is accounted for 560 as is any terminal corrections 570 both antenna and the asset on which it is mounted. From that data a location of the antenna terminal, and thereby the asset on which it is associated, can be identified 580, ending 595 the process.

While the location of an antenna terminal can be determined from a single non-geolocational satellite, the accuracy of the location can be improved by receiving signals from other non-geolocational satellites. Similarly, as the asset moves, the location of the asset can be refined.

Figure 6:
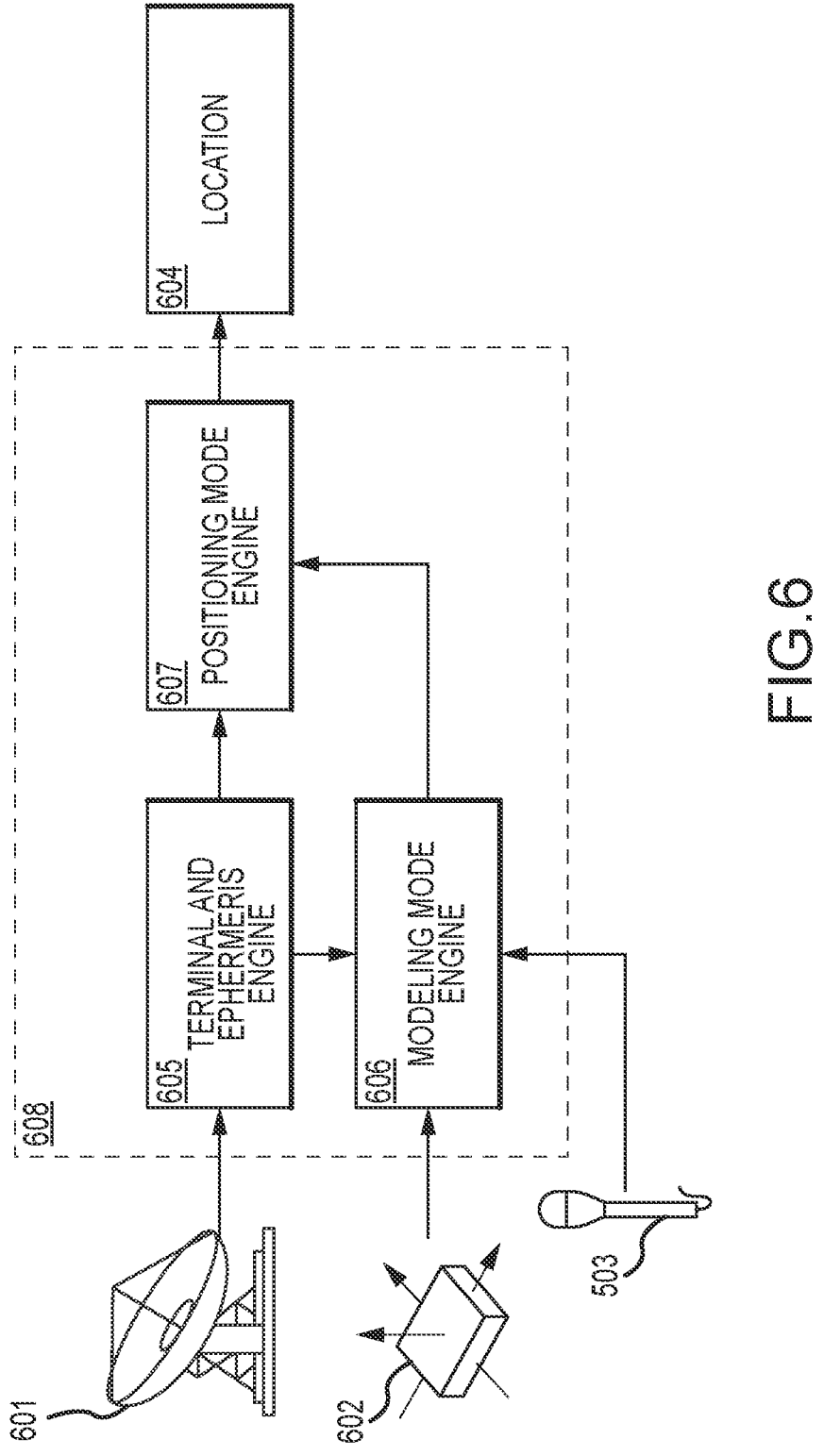
FIG. 6 is a block diagram of one embodiment according to the present invention for a satellite communication antenna pointing geolocation system.

FIG. 6 illustrates, according to one embodiment, a system for determining the location of a satellite antenna terminal 601 and/or the asset associated with the terminal using one or more non-geolocational satellites. The system of the present invention 608 is, one embodiment, a software-based system that can run on a server or laptop with appropriate network connections to ingest data from the external systems.

In one embodiment, the present invention ingests data from satellite antenna terminal 601 that provides a measured azimuth and elevation angle of the satellite. It also provides the orbital element set information referred to herein as the residual position correction, to calculate the actual position of the satellite thereby giving to the system a range value.

In one embodiment an IMU 602 provides information on the attitude of the asset/vehicle on which the terminal is mounted. This information provides the ability to map the satellite antenna's terminal coordinate system to the local ENU coordinate system.

The terminal and ephemeris engine 605 uses the received satellite element set and calculates the position of the satellite using the SGP4 or similar orbit propagator for each time that a terminal azimuth and elevation message is received. This engine also corrects the elevation angle for the standard tropospheric refraction model.

When the location of the terminal antenna is known as a modeling mode engine 606 ingests terminal azimuth and elevation, satellite position, vehicle attitude (e.g., yaw, pitch, roll), or each non-geolocation satellite and GPS location of the terminal. These inputs are saved in a database and then used to generate an accurate system model and a correction to the satellite ephemeris forming a residual position correction.

The positioning mode engine 607 collects satellite terminal azimuth and elevation data, tropospheric corrected factors, the satellite's position as corrected by the residual position correction to generate a localization fix 604 for the antenna/asset. Specifically, the positioning mode engine:
1) Inputs the real-time feed of the satellite terminal azimuth and tropospheric corrected elevation.
2) Applies the terminal rotation correction to the azimuth and elevation data.
3) Inputs the initial satellite position estimate and applies the residual position correction to these data.
4) Filter the time-series of position estimates through an extended Kalman filter 5) Pass geolocation fix and uncertainty estimate to external systems.

In another embodiment of the present invention the system can fuse data from multiple satellite terminals on the same platform to produce a single position estimate.

A system and associated methodology to determine a geolocation of an antenna terminal, and any asset or vessel on which the antenna terminal is associated, using a signal from a non-geolocational (non-GNSS) satellite has been described by way of example above. In such a system/methodology a residual position correction for one or more non-geolocational satellites is formed by observing, through signal reception at a known location, orbital attributes. Using the residual position correction, the actual position of one or more non-geolocational satellites is determined. Upon denial of GNSS data, the angle of reception of a signal from one of the non-geolocational satellites, at which the actual position of the satellite is now known, an accounting for tropospheric refracting and antenna azimuth and elevations adjustments, are used to determine the geolocation of the antenna terminal.

It will also be understood by those familiar with the art that the invention may be embodied in other specific forms without departing from the spirit or essential characteristics thereof. Likewise, the naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

In a preferred embodiment, portions of the present invention can be implemented in software. Software programming code which embodies the present invention is typically accessed by a microprocessor from long-term, persistent storage media of some type, such as a flash drive or hard drive. The software programming code may be embodied on any of a variety of known media for use with a data processing system, such as a diskette, hard drive, CD-ROM, or the like. The code may be distributed on such media or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures and the like that perform tasks or implement abstract data types. Moreover, those skilled in the art will appreciate that the invention can be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be in both local and remote memory storage devices.

An exemplary system for implementing the invention includes a general-purpose computing device such as the form of a conventional personal computer, server or the like, including a processing unit, a system memory, and a system bus that couples various system components, including the system memory to the processing unit. The system bus may be any of several types of bus structures including a memory bus or memory controller, a peripheral bus, and a local bus using any of a variety of bus architectures. The system memory generally includes read-only memory (ROM) and random-access memory (RAM). A basic input/output system (BIOS), containing the basic routines that help to transfer information between elements within the personal computer, such as during start-up, is stored in ROM. The personal computer may further include a hard disk drive for reading from and writing to a hard disk, a magnetic disk drive for reading from or writing to a removable magnetic disk. The hard disk drive and magnetic disk drive are connected to the system bus by a hard disk drive interface and a magnetic disk drive interface, respectively. The drives and their associated computer-readable media provide non-volatile storage of computer readable instructions, data structures, program modules and other data for the personal computer. Although the exemplary environment described herein employs a hard disk and a removable magnetic disk, it should be appreciated by those skilled in the art that other types of computer readable media which can store data that is accessible by a computer may also be used in the exemplary operating environment.

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

Particularly, it is recognized that the teachings of the foregoing disclosure will suggest other modifications to those persons skilled in the relevant art. Such modifications may involve other features that are already known per se, and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A method for Satellite Communication Antenna Pointing Geolocation, the method comprising:
   identifying a first antenna known location;
   receiving at the first antenna the first signal from the satellite wherein the satellite has a public record ephemeris and wherein the first signal includes empirical orbit data of the satellite;
   measuring a first antenna angle between the first antenna and the satellite with respect to true north and the horizon;
   forming a satellite position correction by determining an actual location of the satellite;
   receiving at a second antenna a second signal from the satellite wherein a position of the second antenna is unknown;
   measuring a second antenna angle between the second antenna and the satellite with respect to true north and the horizon;
   communicatively coupling the first antenna with the second antenna; and
   identifying the position of the second antenna using the second signal, the second antenna angle and the satellite position correction.

2. The method for Satellite Communication Antenna Pointing Geolocation according to claim 1, further comprising:
   accounting for a tropospheric refraction of the first signal from the satellite to the first antenna;
   accounting for a tropospheric refraction of the second signal received by the second antenna;
   applying a first antenna terminal correction to the first antenna known location wherein the first terminal correction is formed by collecting empirical orbit data of the first signal over a plurality of orbits thereby determining first antenna tilt and pointing bias; and
   comparing, for the satellite, the actual location of the satellite with the public record ephemeris identifying differences between the actual location of the satellite and the public record ephemeris.

3. The method for Satellite Communication Antenna Pointing Geolocation according to claim 2, wherein forming the position correction includes iteratively comparing the actual location of the satellite with the public record ephemeris collectively identifying differences between the actual location of the satellite and the public record ephemeris.

4. The method for Satellite Communication Antenna Pointing Geolocation according to claim 2, wherein identifying the first antenna known location uses global navigation satellite system data.

5. The method for Satellite Communication Antenna Pointing Geolocation according to claim 2, wherein the first antenna known location is a satellite ground station.

6. The method for Satellite Communication Antenna Pointing Geolocation according to claim 1, wherein the second signal includes a second signal transmit time imbedded in the second signal that is decipherable by the second antenna.

7. The method for Satellite Communication Antenna Pointing Geolocation according to claim 1, wherein responsive to identifying the position of the second antenna, including atmospheric refractive parameters at the position of the second antenna arriving at a revised position of the second antenna.

8. The method for Satellite Communication Antenna Pointing Geolocation according to claim 1, wherein forming a position correction includes using orbital parameters.

9. The method for Satellite Communication Antenna Pointing Geolocation according to claim 8, wherein orbital parameters are selected from a group consisting of Semi-major axis, Eccentricity, Inclination, Right Ascension, Argument of Perigee, and Mean Anomaly.

10. The method for Satellite Communication Antenna Pointing Geolocation according to claim 9, wherein forming includes identifying propagation codes for the satellite.

11. The method for Satellite Communication Antenna Pointing Geolocation according to claim 9, wherein forming includes identifying orbital drift for the satellite.

12. The method for Satellite Communication Antenna Pointing Geolocation according to claim 1, further comprising refining the position correction for the satellite using a plurality of first antennas, each with a known location.

13. The method for Satellite Communication Antenna Pointing Geolocation according to claim 1, further comprising filtering a time-series of the position of the second antenna using an extended Kalman filter.

14. A system for Satellite Communication Antenna Pointing Geolocation, the system comprising:

a first antenna known location;

a first antenna angle measured between the first antenna and the satellite with respect to true north and the horizon wherein the satellite has a public record ephemeris;

a satellite position correction of the public record ephemeris formed by receiving at a first antenna a first signal from a satellite, wherein the first signal includes empirical orbit data of the satellite, thereby determining an actual location of the satellite;

a second signal received at a second antenna from the satellite wherein the second antenna is communicatively coupled to the first antenna and wherein a second antenna position is unknown;

a second antenna angle measured between the second antenna and the satellite with respect to true north and the horizon; and a positioning mode engine operative to identify the position of the second antenna from the second signal, the second antenna angle, and the satellite position correction.

15. The system for Satellite Communication Antenna Pointing Geolocation according to claim 14, further comprising:

a tropospheric refraction accounting of the first signal from the satellite; and a first antenna terminal correction applied to the first antenna known location of the first antenna wherein the first antenna terminal correction includes antenna tilt and offset errors, wherein the satellite position correction includes a difference between the actual location of the satellite and the public record ephemeris for the satellite.

16. The system for Satellite Communication Antenna Pointing Geolocation according to claim 14, wherein the second signal includes a second signal transmit time imbedded in the second signal that is decipherable by the second antenna.

17. The system for Satellite Communication Antenna Pointing Geolocation according to claim 14, wherein the position correction includes orbital drift for the satellite.

18. The system for Satellite Communication Antenna Pointing Geolocation according to claim 14, further comprising a Kalman filtered time-series of the position of the second antenna.

19. The system for Satellite Communication Antenna Pointing Geolocation according to claim 14, further comprising a refined position correction for the satellite based on a plurality of first antennas, each with a known location.

* * * * *